United States Patent [19]
Tsuda

[11] Patent Number: 5,999,968
[45] Date of Patent: Dec. 7, 1999

[54] SYSTEM AND METHOD FOR PRESENTING SHARED INFORMATION TO NETWORK USER IN SPECIFIC ORDER

[75] Inventor: Hiroshi Tsuda, Kawasaki, Japan

[73] Assignee: Fujitsu Limited, Kawasaki, Japan

[21] Appl. No.: 08/837,332

[22] Filed: Apr. 11, 1997

[30] Foreign Application Priority Data

Oct. 24, 1996 [JP] Japan .................................. 8-281940

[51] Int. Cl.⁶ .............................. G06F 15/16; G06F 13/00
[52] U.S. Cl. ........................... 709/213; 709/216; 711/147
[58] Field of Search .................................. 709/213, 216; 711/147

[56] References Cited

U.S. PATENT DOCUMENTS

| | | | |
|---|---|---|---|
| 5,220,657 | 6/1993 | Bly et al. ............................... | 711/152 |
| 5,649,102 | 7/1997 | Yamauchi .................................. | 707/9 |
| 5,710,881 | 1/1998 | Gupta et al. ............................ | 709/200 |
| 5,727,156 | 3/1998 | Herr-Hoyman et al. ................ | 709/219 |

*Primary Examiner*—Krisna Lim
*Attorney, Agent, or Firm*—Staas & Halsey, LLP

[57] ABSTRACT

Users can enter electronic information circulating over a network into a system with simple operations. The electronic information is automatically converted into a common format and then appended with a unique ID on the network. The titles of pieces of electronic information are sorted according to a specified one of conditions of the date and time of entry, the date and time of access, the number of accesses, the related date automatically extracted from the contents of electronic information, and so on, and presented in forms that vary with users.

21 Claims, 30 Drawing Sheets

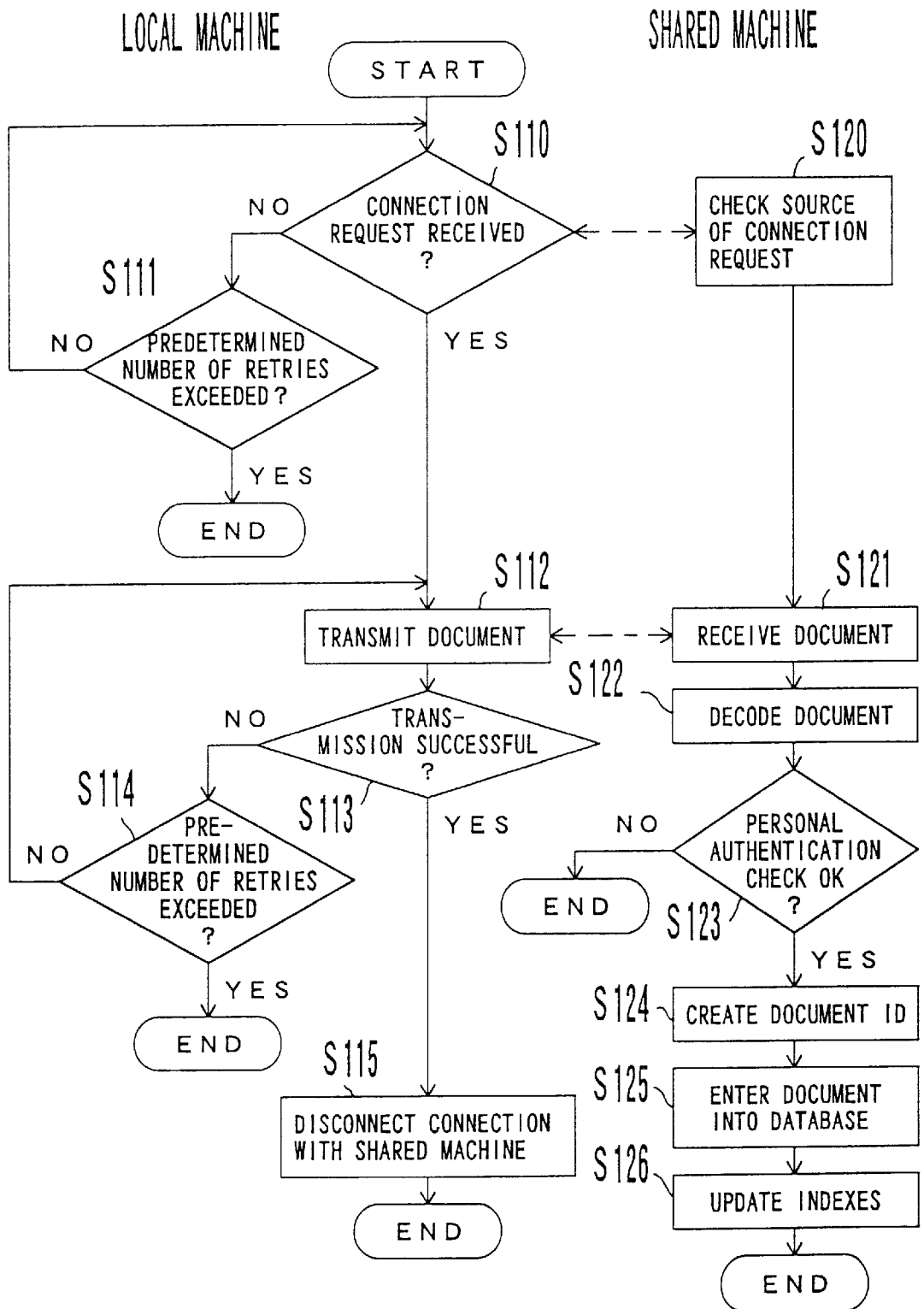
F I G. 4

```
Date: Fri, 20 Sep 1996 01:28:04 MST
From: Makoto YOKOTA <yokota@cslab.fujitsu.co.jp>
Subject: Call for Participation (2nd Int. Conf. on Multiagent Systems)

CALL FOR PARTICIPATION

Second International Conference on Multiagent SysSystems
                           ICMAS-96

December 9 (Mon) - 13 (Fri), 1996
                    Chuuou Plaza, Kyoto, Japan Further information is available from the ICMAS-96 WWW site:
   <http://www.plaza.co.jp/ICMAS96/index.html>
Please send any questions about ICMAS-96 to:
     icmas96@plaza.co.jp
```

FIG. 5

```
<!--
AkCurrentTime = Wed Sep 25 11:17:50 1996
AkSrcTime = Fri, 20 Sep 1996 01:28:04 MST
AkDocType = ML
AkMedia = Mail
AkFrom = Makoto YOKOTA &1t;yokota@cslab.fujitsu.co.jp>
AkUserID = tsuda
AkUserName = Hiroshi Tsuda
AkTitle = 2nd International Conference on Multiagent Systems
                                          (Call for Papers)
AkGenre = NEWS
AkRange = GROUP
AkFileHeader = ML.tsuda.3.0
AkSystemName = zeus
AkRelDate = 96/09/20:96/12/09:96/12/13
-->

```
<html>
<head>
<title> 2nd International Conference on Multiagent Systems
                                    (Call for Papers)</title>
</head>
<body>
<h1>    2nd International Conference on Multiagent Systems
                                    (Call for Papers)</h1>
<pre>
Date: Fri, 20 Sep 1996 01:28:04 MST
From: Makoto YOKOTA <yokota@cslab.fujitsu.co.jp>
Subject: Call for Participation (2nd Int. Conf. on Multiagent Systems)
<HR>
            CALL FOR PARTICIPATION
    Sencond International Conference on Multiagent Systems
                        ICMAS-96

December 9 (Mon) - 13 (Fri), 1996
               Chuuou Plaza, Kyoto, Japan

Further information is available from the ICMAS-96 WWW site:
        <a href="http://www.plaza.co.jp/ICMAS96/index.html">
http://www.plaza.co.jp//ICMAS96/index.html</a>
Please send any questions about ICMAS-96 to:
        icmas96@plaza.co.jp
</pre>
<hr>
<dl>
    <dt> GENRE   <dd> NEWS
    <dt> SCOPE OF INFORMATION  <dd> PERSON
    <dt> CREATOR   <dd> Hiroshi Tsuda
</dl>
</body>
</html>
```

FIG. 7

FIG. 8C
```
22 May 1996
23 March 1996
24 Mar. 1996
September 2, 1996
Sep. 3, 1996
15th May 1996
May 16th, 1996
17th of May in 1996
22-25 September 1997
January 11-12, 1997
January 13 -- 14, 1997
Thu, 11 May 1995
```

| 1 | 05/23 | Mark Sanderson | ESSIR – European Sum | ~90 |
| ●2 | 06/21 | Sigparse_Project | ACL-95 Corpus-based | |

THE THIRD WORKSHOP ON VERY LARGE CORPORA
------------------------------------------------

Friday, 30 June 1995
    8:45 AM – 5:25 PM
MIT, Cambridge, Massachussetts, USA
  at ACL-95 (June 26-29)
(Sponsored by ACL's SIGDAT and SIGNLL)

The workshop will present original research in corpus-based and statistical natural language processing. Topics will include sense disaambiguation, grammar induction, part-of-speech tagging, information retrieval and machine translation.

Further information is available from:

http://www.plaza.co.jp/ACL96/index.html

| 1  05/23 Mark Sanderson    ESSIR – European Sum |  ~90
| ●2 06/21 Sigparse_Project  ACL–95 Corpus–based  |

THE THIRD WORKSHOP ON VERY LARGE CORPORA
————————————————————————

Friday, 30 June 1995
  8:45 AM – 5:25 PM
MIT, Cambridge, Massachussetts, USA
  at ACL–95 (June 26–29)
(Sponsored by ACL's SIGDAT and SIGNLL)

The workshop will present original research in corpus–based and statistical natural language processing. Topics will include sense disaambiguation, grammar induction, part–of–speech tagging, information retrieval and machine translation.

Further information is available from:

http://www.plaza.co.jp/ACL96/index.html

~91

[Title] ACL–95 Corpus–based NLP Workshop ■  ~92

FIG. 13

| 1  05/23 Mark Sanderson | ESSIR – European Sum | ~90
| ●2  06/21 Sigparse_Project | ACL–95 Corpus–based |

THE THIRD WORKSHOP ON VERY LARGE CORPORA
――――――――――――――――――――――――――――――― ~91

Friday, 30 June 1995
    8:45 AM – 5:25 PM
 MIT, Cambridge, Massachussetts, USA
   at ACL–95 (June 26–29)
 (Sponsored by ACL's SIGDAT and SIGNLL)

The workshop will present original research in corpus–based and statistical natural language processing. Topics will include sense disaambiguation, grammar induction, part–of–speech tagging, information retrieval and machine translation.

Further information is available from:

http://www.plaza.co.jp/ACL96/index.html

[GENRE] NONE    Business ¦Computer¦ News Hobby  ~92

FIG. 14

| 1 | 05/23 Mark Sanderson | ESSIR – European Sum | ⟋90
|---|---|---|
| ●2 | 06/21 Sigparse_Project | ACL–95 Corpus-based |

THE THIRD WORKSHOP ON VERY LARGE CORPORA
------------------------------------------

Friday, 30 June 1995
     8:45 AM – 5:25 PM
MIT, Cambridge, Massachussetts, USA
   at ACL–95 (June 26–29)
(Sponsored by ACL's SIGDAT and SIGNLL)

The workshop will present original research in corpus-based and statistical natural language processing. Topics will include sense disaambiguation, grammar induction, part-of-speech tagging, information retrieval and machine translation.

Further information is available from:

http://www.plaza.co.jp/ACL96/index.html

⟋91

[DISCLOSURE RANGE]  PERSON  GROUP  [RESEARCH INSTITUTE]  COMPANY  GENERAL

⟋92

FIG. 15 http://www.test.co.jp/SORDER/index.html  T

93 — [         ]  SEARCH

- ACL-95 Corpus-based NLP Workshop
    ML COMPUTER 96/7/26
- java, mocha
    fj COMPUTER 96/7/25
- SERVICE BUSINESS NEWS
    fj NEWS 96/7/21
- HOW TO USE PAYMENT SYSTEM
    ML BUSINESS 96/6/30
- VIDEO IMAGE FORMAT
    comp HOBBY 96/7/20
- NEW PRODUCT INFORMATION
    ML BUSINESS 96/7/10
- ON SPEED OF PCJ BUS
    fj COMPUTER 96/7/3

F I G. 1 6 http://www.test.co.jp/SORDER/sorder.cgi?  T

CONTENTS FILE                    CHANGE  DELETE

ACL-95 Corpus-based NLP Workshop
[Computer, Research Institute]
date: 21 Jun 1995 18:30
From: Sigparse Project

THE THIRD WORKSHOP ON VERY LARGE CORPORA

Friday, 30 June 1995
   8:45 AM - 5:25 PM
MIT, Cambridge, Massachussetts, USA
   at ACL-95 (June 26-29)
(Sponsored by ACL's SIGDAT and SIGNLL)

The workshop will present original research in corpus-based and statistical natural language processing. Topics will include sense disaambiguation, grammar induction, part-of-speech tagging, information retrieval and machine translation.

Further information is available from:

http://www.plaza.co.jp/ACL96/index.html

FIG. 17 http://www.test.co.jp/SORDER/index.html    T

93 — [    ]    SEARCH

● SERVICE BUSINESS NEWS
    fj NEWS  96/7/21
● ACL-95 Corpus-based NLP Workshop
    ML COMPUTER  96/7/26
● java, mocha
    fj COMPUTER  96/7/25
● HOW TO USE PAYMENT SYSTEM
    ML BUSINESS  96/6/30
● VIDEO IMAGE FORMAT
    comp HOBBY  96/7/20
● NEW PRODUCT INFORMATION
    ML BUSINESS  96/7/10
● ON SPEED OF PCJ BUS
    fj COMPUTER  96/7/3

FIG. 18

| | | |
|---|---|---|
| http://www.test.co.jp/SCHEDULER/sch.cgi? | | T |

| 27 | TUE | JSSST tutorial on multi-agent |
| | | JEIDA committee |
| 28 | WED | Javascript TUTORIAL |
| | | NEW PRODUCT INFORMATION |
| | | PAGE OF FISHING |
| 29 | THU | GIF ANIMATION |
| | | Linux-RELATED PAGE |
| | | SERVICE BUSINESS NEWS |
| 30 | FRI | ACL-95 Corpus-based NLP Workshop |
| | | SERVICE BUSINESS NEWS |
| | | ON Proxy server |

F I G. 1 9 http://www.test.co.jp/SCHEDULER/sch.cgi?   T

TSUYAMA'S SCHEDULE FOR BEFORE AND AFTER JULY 16, 1996

| SUN | MON | TUE | WED | THU | FRI | SAT |
|---|---|---|---|---|---|---|
| | | 7/2 CONFERENCE | 3 | 4 | 5 | |
| 7 | 8 | 9 OFF | 10 | 11 CONFERENCE | 12 CONFERENCE BUSINESS TRIP | 13 |
| 14 | 15 | ⑯ | 17 CONFERENCE | 18 | 19 | 20 |
| 21 | 22 | 23 | 24 COMMITTEE | 25 CONFERENCE | 26 CONFERENCE | 27 |
| 28 | 29 BUSINESS TRIP | 30 | 31 | 8/1 | 2 | 3 |
| 4 | 5 | 6 | 7 COMMITTEE | 8 | 9 | 10 |

JULY    AUGUST

GROUP: INFORMATION SHARING(G1)    SEARCH(G2)    NLP

F I G. 2 0 http://www.test.co.jp/SCHEDULER/sch.cgi?  T

NLP GROUP SCHEDULE FOR JULY, 1996

| SUN | MON | TUE | WED | THU | FRI | SAT |
|---|---|---|---|---|---|---|
|  | 1<br><br>M | 2<br><br>G2 | 3<br><br>I | 4<br><br>M | 5<br><br>O | 6 |
| 7 | 8 | 9<br><br>T | 10<br><br>N, O | 11<br><br>G1 | 12<br>CONFER-<br>ENCE<br>T, M | 13 |
| 14 | 15<br><br>N | 16<br><br>I | 17<br><br>G2 | 18<br><br>I, N | 19 | 20 |
| 21 | 22<br><br>I | 23<br><br>O | 24<br><br>T | 25<br><br>M, GI | 26<br>CONFER-<br>ENCE<br>I | 27 |
| 28 | 29<br><br>T, N | 30 | 31 |  |  |  |

JUNE    AUGUST    BEFORE AND AFTER TODAY

PERSON: TSUYAMA(T)    MATSUDA(M)    INOUE(I)
        NISHIYAMA(N)  OCHIAI(O)
GROUP:  INFORMATION SHARING(G1)    SEARCH(G2)

F I G. 2 1

| http://www.test.co.jp/SCHEDULER/sch.cgi? | T |

WEEKLY SCHEDULE FROM JULY 14, 1996

| 1 4 | SUN | |
|---|---|---|
| 1 5 | MON | NISHIYAMA 14:00 CONFERENCE |
| 1 6 | TUE | INOUE 13:30 @FIRST ARRANGEMENT |
| 1 7 | WED | SEARCH 15:30 GROUP CONFERENCE |
| 1 8 | THU | INOUE 11:30 COMMITTEE<br>NISHIYAMA 14:00 @SECOND ARRANGEMENT |
| 1 9 | FRI | |

F I G. 2 2

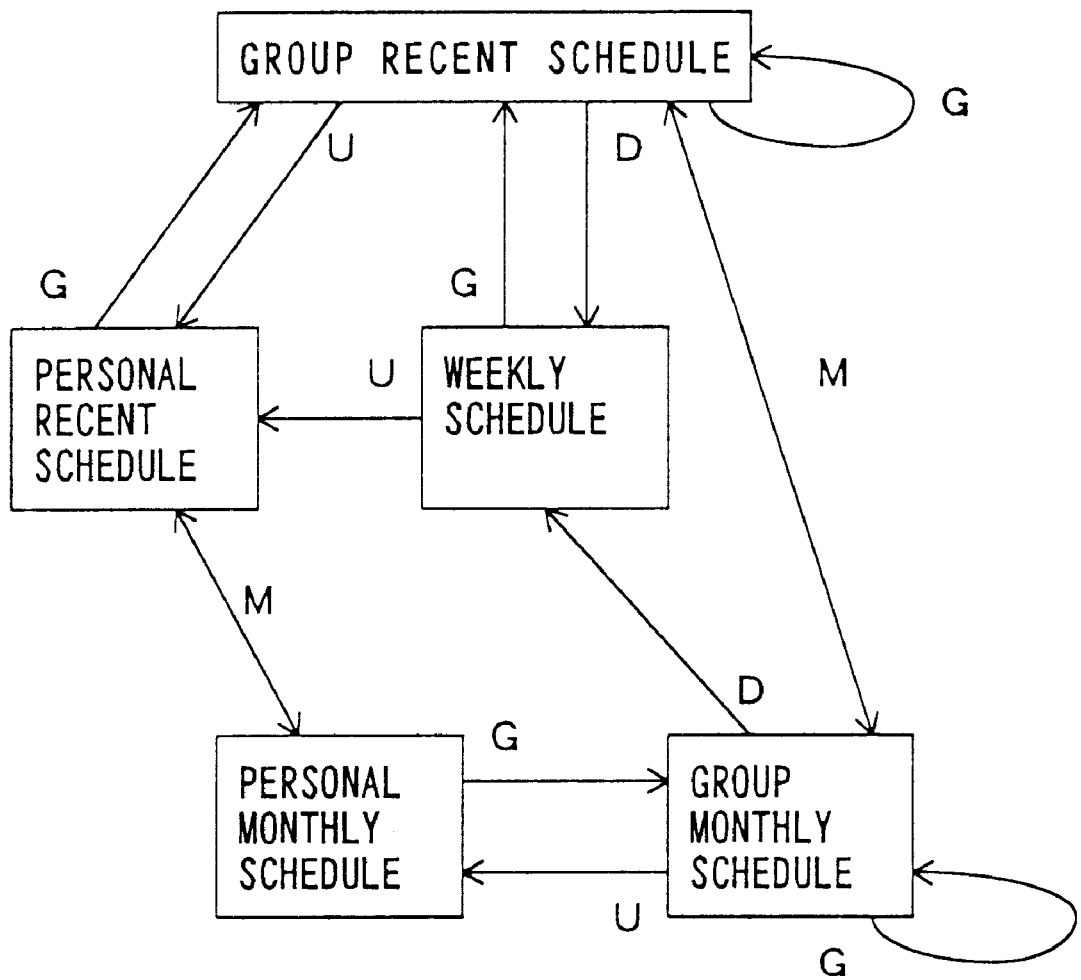
F I G. 2 3 http://www.test.co.jp/GEDIT/gedit.cgi?file   T

GROUP-EDITED TEST PAGE

THIS IS GROUP-EDITED TEST DOCUMENT IN HTML

1. SPECIFY ID OF DOCUMENT TO BE UPDATED WITH EDITOR, OR WORD PROCESSOR

2. RETRIEVE FILE CORRESPONDING TO DOCUMENT ID FROM DB

FIG. 24

```
<HTML>
<HEAD>
<TITLE> TestPage </TITLE>
</HEAD>
<BODY>
<H1> GROUP-EDITED TEST PAGE
     THIS IS GROUP-EDITED TEST PAGE IN HTML <OL>
<LI> SPECIFY ID OF DOCUMENT TO BE UPDATED
     WITH EDITOR, OR WORD PROCESSOR
<LI> RETRIEVE FILE CORRESPONDING TO DOCUMENT ID
     FROM DB ■
```

F I G. 2 5

```
http://www.test.co.jp/GEDIT/gedit.cgi?file    T
```

*** BEING UPDATED BY YAMADA ***

..................................................

GROUP-EDITED TEST PAGE

THIS IS GROUP-EDITED TEST DOCUMENT IN HTML

1. SPECIFY ID OF DOCUMENT TO BE UPDATED
   WITH EDITOR, OR WORD PROCESSOR

2. RETRIEVE FILE CORRESPONDING TO DOCUMENT ID
   FROM DB

FIG. 26

SYSTEM AND METHOD FOR PRESENTING SHARED INFORMATION TO NETWORK USER IN SPECIFIC ORDER

BACKGROUND OF THE INVENTION

1. Field of the Invention

The present invention relates to a system and method for sharing documents using a network and ordering and presenting a group of shared documents, which, for example, can be used as a basic technique for implementing an intranet which is an information sharing system using the Internet.

2. Description of the Related Art

The World Wide Web (WWW) of the Internet has shown explosive growth in recent years, in particular, as information publishing media. An intranet is utilized to employ the WWW as an information sharing tool for a closed network such as an intra-company network. With the intranet, since existing infrastructure, such as WWW servers, WWW browsers, etc., can be used without modification, network-based information sharing can be forwarded at relatively low cost.

However, beginners will have difficulties in sharing document information in the present WWW system because they must comply with the following procedure:

1. To describe the contents of a document in a language called hyper text markup language (HTML), which is one of document describing languages that specify the structure of documents with tags.
2. To copy an HTML file into the computer of a WWW server. In general, the file transfer protocol (FTP) of the Internet is often used.
3. To attach a uniform resource locator (URL), which is the identification (ID) of the document on the network, to correspond with the directory of the WWW server that stores the document.
4. To perform the processing opposite to the above in order to revise the document. The corresponding directory is obtained on the basis of the URL, the file is copied into a local machine for revision, and the revised document is reentered.

Another method of sharing information is to use a local area network (LAN) composed of, for example, personal computers. This is implemented mainly by software called groupware. A typical example of groupware is the Lotus "NOTES".

The conventional software of this type has the following problems:

1. Documents can be shared only among persons who use the same software.
2. In order to extend the range of information sharing to the Internet, it is required to install a gateway between the LAN and the Internet.

In sharing documents using the conventional system, the following problems are encountered:

1. It is an intricate procedure to write document information in the hyper text markup language in order to make the information open through the WWW.
2. It is troublesome to copy a file into a shared machine in order to establish a correspondence between a directory and a uniform resource locator.
3. In updating a document, it is required to establish a correspondence between a uniform resource locator and a directory and make sure that two or more persons will not revise the same document at the same time.

SUMMARY OF THE INVENTION

It is an object of the present invention to provide a system and method for sharing information which permit information to be shared readily on a network such as the Internet, intranet, or the like.

An information sharing system of the invention comprises an information sharing device (shared machine) for managing any electronic information and an information terminal device (local machine) connected with the information sharing device by a network. Electronic information includes document data, graphic data, programs, etc.

According to the first aspect of the invention, an information sharing device comprises an ID management unit and a database unit. The ID management unit creates the unique identification information on the network on the basis of at least one of user identification information and time information and appends it to electronic information created by arbitrary software and converted to a format sharable on the network. The database unit files the electronic information.

According to the second aspect of the invention, an information sharing unit comprises a database unit, a storage unit, and an ordering unit. The database unit files electronic information created by arbitrary software and converted to a format sharable on the network. The storage unit stores index information for ordering the electronic information. The ordering unit refers to the index information to order management information for one or more items of electronic information on the basis of at least one of time information and information related to access to the electronic information.

According to the third aspect of the invention, an information terminal device comprises an input unit, a conversion unit, and a transmission unit. The input unit inputs electronic information created by arbitrary software. The conversion unit automatically converts the input electronic information to a format sharable on the network and appends to it additional information mainly used to create the unique identification information on the network. The transmission unit sends the converted electronic information over the network.

According to the fourth aspect of the invention, an information terminal device comprises a specification unit and a display unit. The specification unit specifies a view to shared electronic information based on at least one of time information and information related to access to the electronic information. The display unit displays management information for one or more items of electronic information ordered according to a specified way.

BRIEF DESCRIPTION OF THE DRAWINGS

FIG. 4 is a flowchart for sending/receiving documents;

FIG. 5 shows an example of a plaintext document prior to conversion;

FIG. 6 shows the first half of an HTML document after conversion;

FIG. 7 shows the second half of an HTML document after conversion;

FIG. 8C shows examples of date representations in English;

FIG. 8D shows examples of date representations in Japanese;

FIG. 8E shows examples of other date representations;

FIG. 12 shows an example of a document display screen;

FIG. 13 shows an example of a title entry screen;

FIG. 14 shows an example of a genre entry screen;

FIG. 15 shows an example of an entry screen for information disclosure range;

FIG. 16 shows a first view of information ordered in access time sequence;

FIG. 17 shows an example of a display of the contents of a selected document;

FIG. 18 shows a second view of information ordered in access time sequence, which is in a different order to that of FIG. 16;

FIG. 19 shows an example of a display screen in which information is embedded in a calendar;

FIG. 20 shows an example of a view of a recent schedule of an individual;

FIG. 21 shows an example of a view of a monthly schedule of a group;

FIG. 22 shows an example of a view of a weekly schedule;

FIG. 23 shows calendar view transitions;

FIG. 24 shows an example of a display screen of a shared document prior to updating viewed with a browser;

FIG. 25 shows an example of a display screen of the shared document being edited with an editor;

FIG. 26 shows an example of a display screen when another user is about to update the shared document being edited.

DETAILED DESCRIPTION OF THE PREFERRED EMBODIMENTS

Preferred embodiments of the present invention are now described in detail in conjunction with the accompanying drawings.

In the present day the Internet has been making progress, documents, such as electronic mails, network news, etc., which individuals receive, keep on increasing. The use of a device of the present invention allows information which, of such documents, seem useful to users to be entered into a group-shared machine together with additional information with a simple operation.

The documents entered and registered in the machine can be shared with other users through the Internet World Wide Web. Management information for the documents is sorted and presented for each user by embedding it in a calendar in accordance with a document registration time sequence, an access time sequence, the number of accesses, or dates extracted from document contents. This allows documents to be browsed not only with fixed hyperlinks but also in various ways varying with users.

The shared documents need not only to be registered but also to be updatable. The user can specify a document identification (ID) to update the corresponding document on a local machine. Also, exclusive control is performed in such a way as to inhibit a user from updating a document that is being updated by another user.

Figure 1:
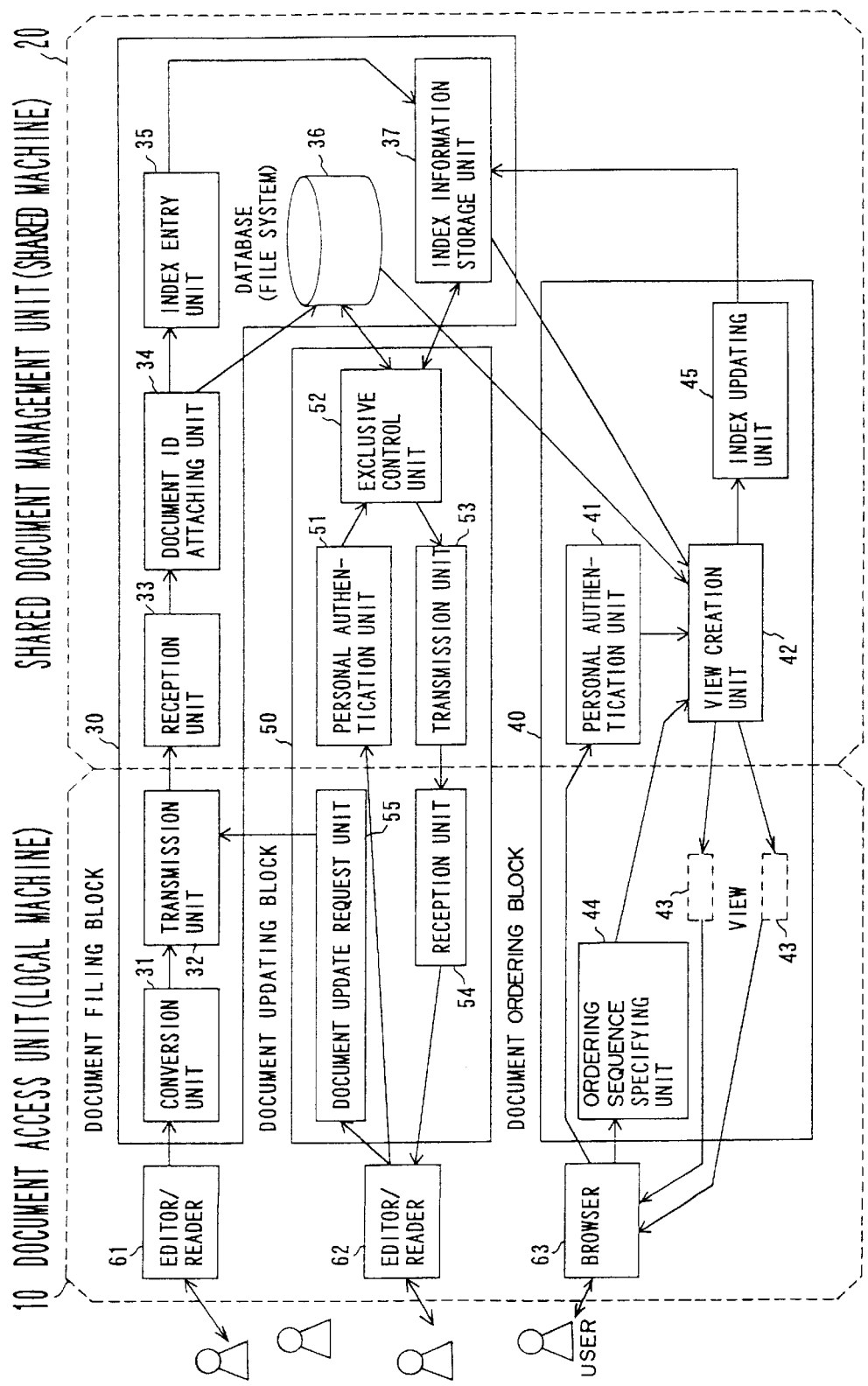
FIG. 1 is a block diagram of an exemplary arrangement of the invention.

FIG. 1 is a block diagram of a system of the invention.

This system comprises at least one document access unit 10 serving as a local machine and a shared document management unit 20 serving as a shared machine. The document access unit 10 and the shared document management unit 20 are connected by a network.

The system of the invention is roughly classified into the following three functional blocks.

The first is a document filing block 30 that converts a document into a common format and sends it from the document access unit (local machine) 10 to the shared document management unit (shared machine) 20 for storage.

The second is a document ordering block 40 that orders (or sorts) stored documents for presentation to users.

The third is a document updating block 50 that updates the contents of previously stored documents through the document access unit 10.

Upon receipt of a request to enter a document from an editor/reader 61 such as a document editor or a news/mail reader, the document filing block 30 converts the document into a common format in a conversion unit 31 and sends it to the shared document management unit 20 through a transmission unit 32. The shared document management unit 20 receives that document in a reception unit 33, produces a document ID which is unique on the network and adds it to the document in a document ID attaching unit 34, and enters it into a document database (file system) 36. In addition, an index entry unit 35 produces an index required to order documents and enters it into an index information storage unit 37.

Upon receipt of a request for access to a document made by a browser 63, the document ordering block 40 transfers it from the document access unit 10 to the shared document management unit 20. In this unit 20, a personal authentication unit 41 determines the qualification of a person who made that request, and a view creation unit 42 creates a view 43 consisting of a list of management information items, such as the titles of all documents or the titles of documents containing a character string specified by the user who has made the request. The list is displayed through the browser 63 in the document access unit 10. The user can see the document ID attached by the document ID attaching unit 34 through the view 43.

At this point, how documents are to be sorted and displayed in the view 43 can be specified by an ordering sequence specifying unit 44. For example, the ordering sequence can be specified in such a way that the titles of the documents are sorted in time sequence in which the documents were entered, or in time sequence in which each of the documents was read lastly by users, or in sequence according to the number of times each of the documents was read by users. In addition, it is also possible to specify the titles of the documents to be sorted in such a way that they are displayed on a calendar associated with date information automatically extracted from the contents of the documents.

When access to a document is made through the browser 63, information on the date and time of access to that document and the number of times access to that document was made, stored in the index information storage unit 37, is updated by an index updating unit 45.

In the document updating block 50, the personal authentication unit 51 verifies an identity of a user who has made a request for a document specifying its ID through the editor/reader 62, and the exclusive control unit 52 performs necessary document exclusive control and sends a document read from the database 36 through the transmission unit 53 to the document access unit 10. In the document access unit 10, the reception unit 54 receives that document and passes it to the editor/reader 62.

The user can revise the contents of the document received by the editor/reader 62 and make a request for reentry of the results of revision through the document update request unit 55. In this case, the revised document is sent from the document update request unit 55 through the transmission unit 32 to the shared document management unit 20 and then reentered into the database 36.

The above arrangement functions as follows:

1. A document that a user wishes to enter is automatically converted into a common document structure (e.g., HTML) on the basis of the contents of that document, information added by the user at the time of entry, and user authentication information in the local machine.
2. The converted document is sent to the shared machine over the network.
3. The document is accumulated with the unique document ID (e.g., URL) on the network appended, the ID being generated from the user authentication information, the time of entry, etc.
4. Stored documents are presented for each user in various ways according to ordering methods.
5. At the time of updating a document, it is copied from the shared machine to the local machine by specifying the document ID and the revised document is sent over the network to the shared machine for reentry.
6. A document that is being updated by a certain user is locked to deny access by another user to that document by exclusive control.

Figure 2A:
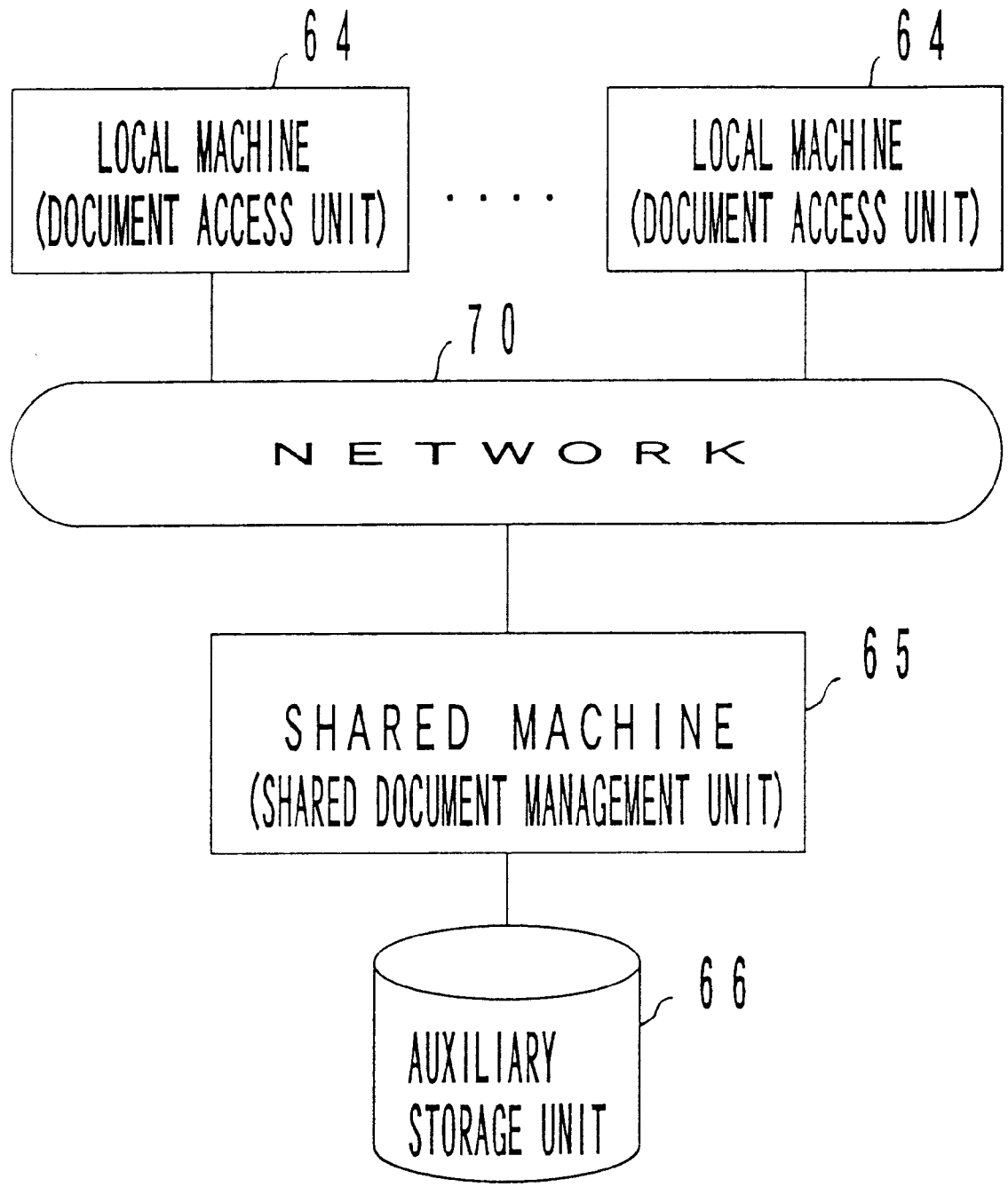
FIG. 2A shows a system configuration of the invention.

FIG. 2A shows a document sharing system configuration of the present invention.

In FIG. 2A, 64 denotes a local machine serving as a document access unit, 65 a shared machine serving as a shared document management unit, 66 an auxiliary storage unit, such as a magnetic disk unit, in which a document database is stored, and 70 a network. The network 70 may be any of a telephone-line-based public network, a dedicated network, an integrated services digital network (ISDN), and a local area network (LAN) as long as it allows communication between the local machine 64 and the shared machine 65.

Figure 2B:
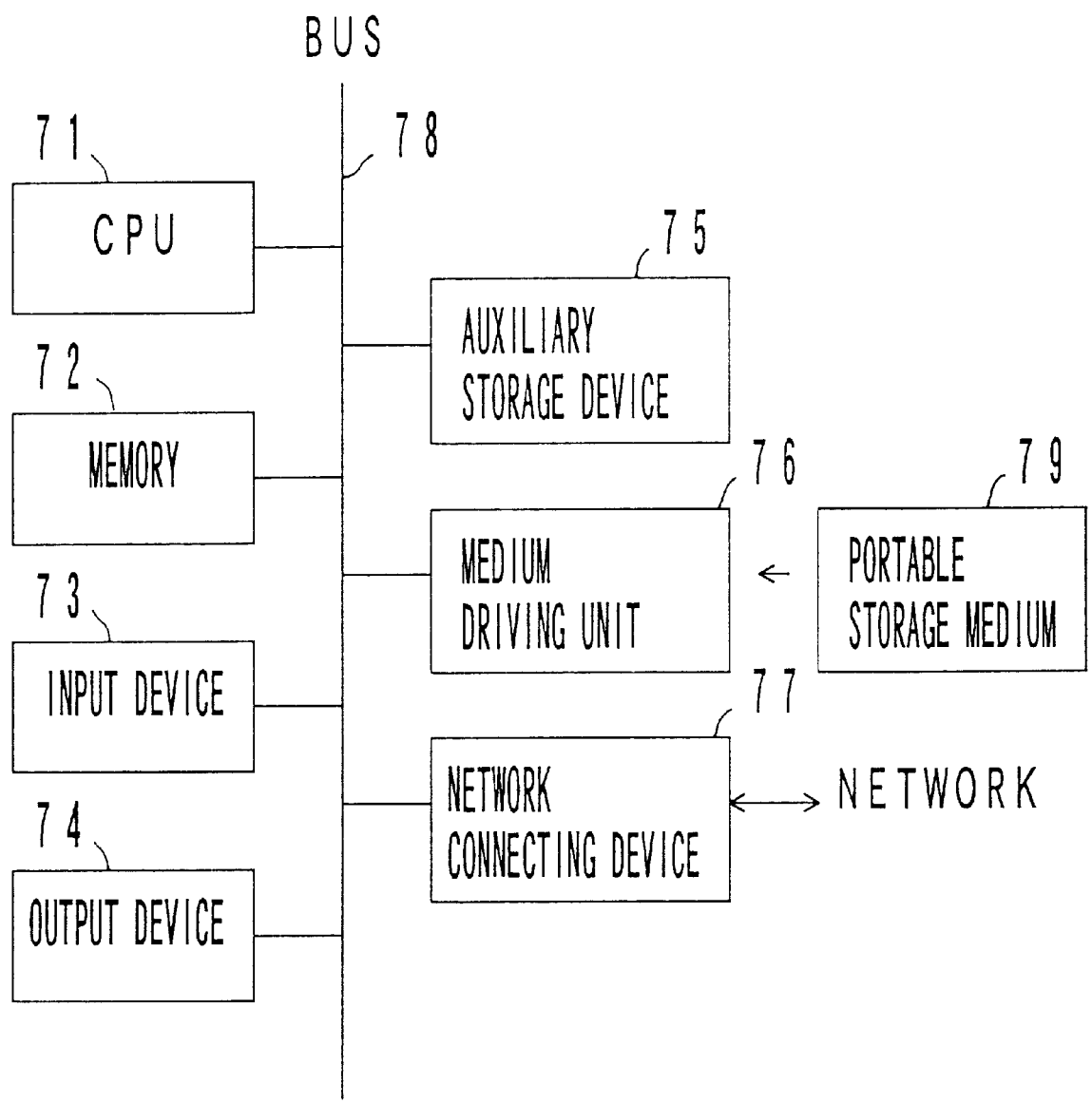
FIG. 2B shows an arrangement of an information processing unit.

FIG. 2B is a schematic diagram of an information processing unit used as the local machine 64 or the shared machine 65 of FIG. 2A. The information processing unit is equipped with a CPU (central processing unit) 71, a memory 72, an input device 73, an output device 74, an auxiliary storage device 75, a medium driving unit 76, and a network connecting device 77, these components being interconnected by a bus 78.

The CPU 71 executes programs stored in the memory 72 to implement the processing for the document sharing system. As the memory 72, use is made of a read only memory, a random access memory, or the like.

The input device 73, corresponding to a keyboard or pointing device, is used to enter requests and commands by users. The output device 74, corresponding to a display unit or printer, is used to output documents and views.

The auxiliary storage device 75, which is a magnetic disk unit, optical disk unit, or a magneto-optical disk unit, can preserve programs and data. When used as the auxiliary storage unit 66 of FIG. 2A, it serves as a database that stores documents and indexes.

The medium driving unit 76 drives a portable storage medium 79 to make access to its stored contents. As the portable storage medium, use is made of any type of computer-readable storage medium such as a memory card, floppy disk, CD-ROM (compact disk read only memory), optical disk, or magneto-optical disk. The portable storage medium 79 stores programs for the document sharing system as well as data.

The network connecting unit 77 is connected to a communications network and performs data conversion associated with communication. The information processing unit can accept necessary data and programs from other information processing units over the network connecting device 77.

Hereinafter, the invention will be described with reference to the following three phases:

(1) Document registration: translating a document to a common format and sending it from the local machine to the shared machine for storage
(2) Document ordering: ordering and presenting stored documents
(3) Document update: revising a previously stored document on the local machine.

Phase of document registration

Figure 3:
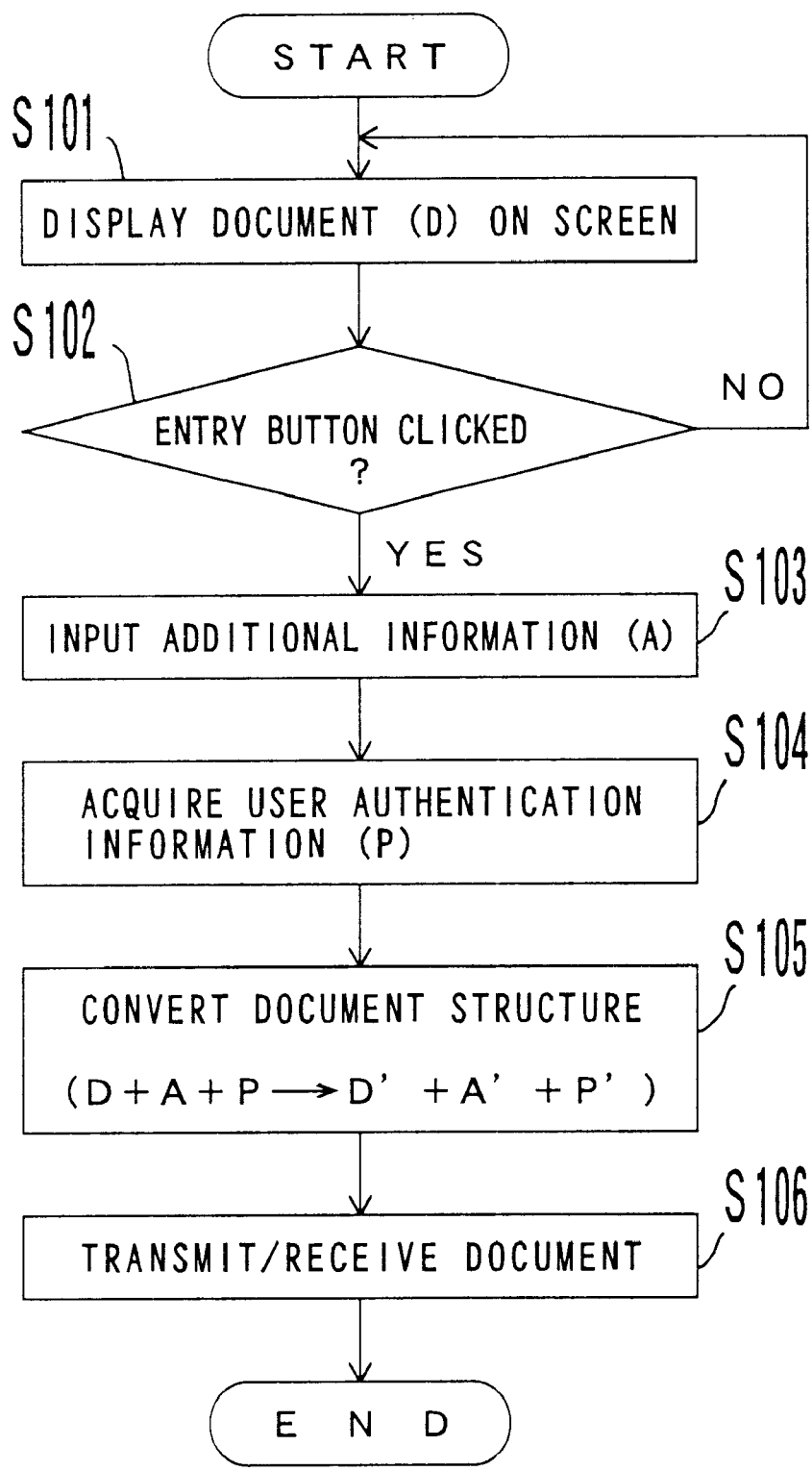
FIG. 3 is a flowchart for entering documents.

FIG. 3 is a flowchart for processing at the time of document entry.

In step S101, a document is displayed on the screen by the editor or news/mail reader in the local machine (the contents of the document are written as D). In entering the document (or part of the document) being displayed on the screen into the shared machine, the user gives an instruction to capture the document with a click of the entry button.

In step S102, a decision is made as to whether the entry button has been clicked. If it is detected that the entry button has been clicked, then the procedure goes to step S103. In document entry, the user can specify the title and genre (or category) of the document and the information sharing range. In step S103, the user enters such information to be appended to that document (the information appended by the user is written as A).

In step S104, user authentication information and entry time information that the local machine has are obtained automatically (the information is written as P).

In step S105, the document contents D, the information A appended by the user at the time of entry and the user authentication information P of the local machine (i.e., D+A+P) are passed to the conversion unit 31 of FIG. 1 for conversion into the common document structure. The document after conversion is represented by D'+A'+P'.

In step S106, the document (D'+A'+P') after conversion is sent to the transmission unit 32 for document transmit/receive processing.

FIG. 4 is a flowchart for the document transmit/receive processing. The dotted arrows indicate that communication is made between the local machine and the shared machine.

In steps S110 and S111, the local machine (document access unit 10) issues a connection request to the shared machine (shared document management unit 20). If connection fails after several retries, the procedure is terminated as failure in document transmission.

In step S112, the contents of the document are sent to the shared machine over the network. If, in steps S113 and S114, transmission was successful, then the connection with the shared machine, serving as a server, is released in step S115 and the procedure comes to an end. If, on the other hand, the transmission fails after several retries in steps S113 and S114, then the procedure is terminated as failure in document transmission.

In step S120, the shared machine checks the validity of a source of the connection request in response to the connection request from the local machine.

After that, the document sent from the local machine is received in step S121 and the contents of the received document, D'+A'+P', are decoded in step S122.

In step S123, it is checked whether or not the transmission is from an authorized user based on the personal authentication information P' and the information obtained by checking the source of the request. If the personal authentication check ends in failure, then the document is discarded and the procedure is terminated.

In step S124, the unique document ID on the network is created from the personal authentication information and the time of entry.

As an example, when a user, named Tsuda, enters a document at seventeen minutes fifty seconds past eleven of Sep. 25, 1996, a URL of fj. tsuda. 960925111750. html is created as a document ID. Here, "fj" represents the source name, "tsuda" represents personal information, and "960925111750" represents date and time information.

In step S125, the received document is entered into the database (DB) with the document ID appended.

In step S126, the related date and time are extracted from the contents of the document and the contents of common indexes and indexes for individual users used in the document sorting block 40 are updated. Index information includes date and time of document entry, date and time of access, related date and time in documents, the number of accesses, etc., which will be described later in detail.

The document structure conversion in the conversion unit 31 of the document filing block 30 shown in FIG. 1 will be described next taking conversion from plaintext to HTML by way of example.

FIG. 5 shows an example of a plaintext document prior to conversion, and FIGS. 6 and 7 show an example of an HTML document after conversion.

Suppose here that such a plaintext mail (corresponding to D) as shown in FIG. 5 is captured for entry into the shared machine. At the time of capture, the user can provide additional information A. For example, the additional information A includes:

Title: Second International Conference on Multiagent Systems (Call for Papers)

Genre: news

Information disclosure range: group

The information P that the local machine retrieves automatically includes:

User ID: tsuda

User name: Hiroshi Tsuda

Machine name: zeus

Date and time of capture: Wed Sep. 25 11:17:50 1996

The document after conversion into the HTML format is shown in FIGS. 6 and 7. The header portion shown in FIG. 6, i.e., the portion from [<!—] to [→], corresponds to A'+P'. The conversion unit 31 determines automatically that the document is a mail message on the basis of the document format shown in FIG. 5 and converts the document so that sender information, etc. will also be contained in the header.

The body of the document after conversion shown in FIG. 7 (from <html> to </html>) corresponds to D' described above. A title indicated as <title> is added and the URL that is present toward the end of the original mail (i.e., http://www.plaza.co.jp/ICMAS96/index.html) is changed to the anchor of the HTML.

In the present invention, the document-related date and time are automatically extracted from the contents of the document in accordance with the following procedure:

1. Full-size numerals and Chinese (or Japanese) numerals are changed to half-size numerals to unify numeral representations. Here, Chinese and Japanese numeral expressions encoded in multi-byte code, such as EUC, UNICODE, etc., are changed to those in ASCII characters.

2. Pattern matching is performed between a representation pattern for date and time in Japanese, English or other representations and a character string in a document to thereby extract the related time.

Figure 8A:
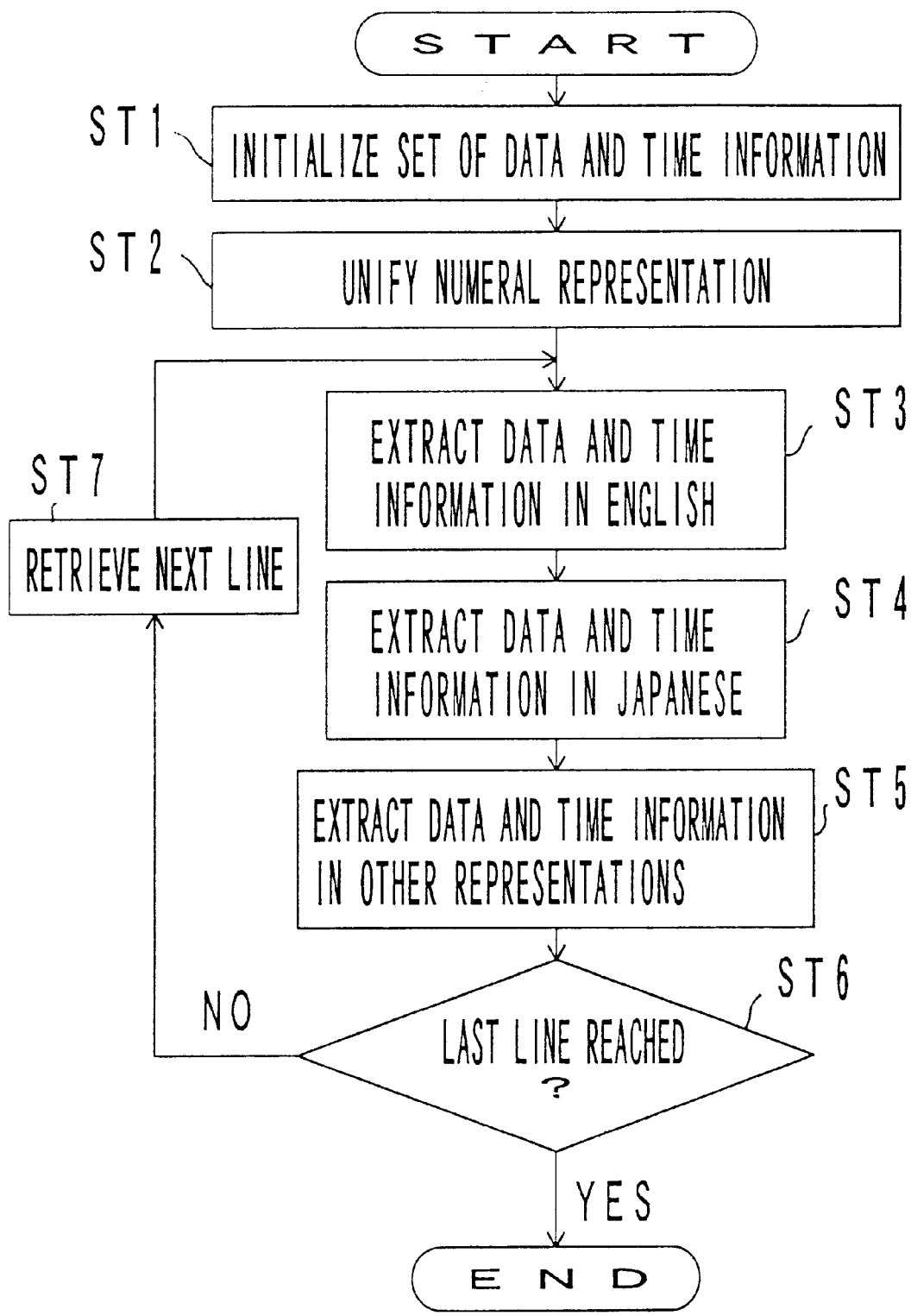
FIG. 8A is a flowchart for extracting time and date.

FIG. 8A is a flowchart for the extraction of date and time information. When the processing is started, the related date and time information extraction routine in the shared machine initializes variables in which a set of date and time information is stored in step ST1, and unifies the numeral representations in step ST2. In step ST3, date and time information in English is extracted from one line and, in step ST4, date and time information in Japanese is extracted from it. In step ST5, date and time information in other representations is extracted from it.

In step ST6, a decision is made as to whether the last line is reached. If the last line is not reached, then the next line is retrieved in step ST7 and the processing in step ST3 and thereafter is repeated. When the last line is reached, the processing terminates.

In step ST2, the numeral representations are unified in accordance with the following procedure that performs:

1. Change full-size numerals 0, 1, . . . , 9 to half-size numerals.
2. Change Chinese numerals 0, 一, . . . , 九 to half-size numerals 0, 1, . . . , 9.
3. Change all the representations "(numeral a) 十 (numeral b)" to "(numeral a) (numeral b)". Here, the chinese character "十" means that numeral "a" is in units of tens and numeral "b" is in single units.
4. Change all the representations "(numeral)十" to "(numeral)0". Here, "十" means numeral "0" in single units.
5. Change all the representations "十(numeral)" to "1(numeral)". Here, "十" means numeral "1" in units of tens.
6. Change all of "十" to "10". Here, "十" means the number "10".

Thus, the numeral representations of up to two digits are all changed to representations in half-size numerals.

Figure 8B:
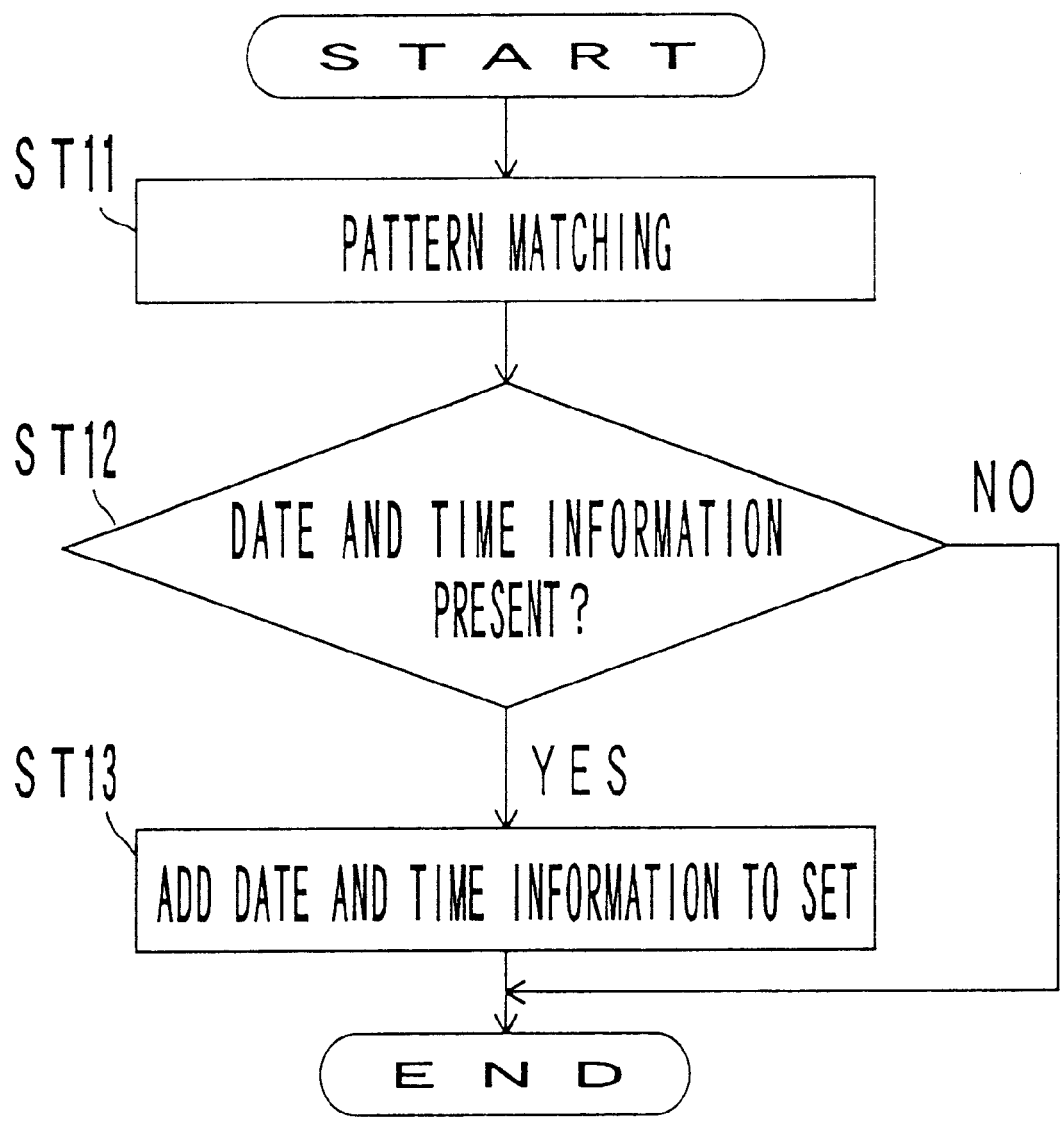
FIG. 8B is a flowchart for adding time and date.

The processing in each of steps ST3, ST4 and ST5 is performed in accordance with the flowchart shown in FIG. 8B. The related date and time extraction routine first performs pattern matching between one or more date and time representation patterns prepared in advance and a character string in a document in step ST11, and next makes a decision of whether there is date and time information that matches one of the representation patterns in step ST12.

If such date and time information is present, then it is added to the set of date and time information in step ST13 and the procedure comes to an end. If, however, such information is not present, the procedure comes to an end.

FIGS. 8C, 8D and 8E show examples of date representations that can be extracted from documents by the related date and time extraction routine. More specifically, FIG. 8C shows examples of date representations in English, FIG. 8D shows examples of date representations in Japanese, and FIG. 8E shows other examples of date representations.

Next, the document management method in the shared document management unit 20 in the shared machine, particularly how to use indexes, will be described.

Figure 9:
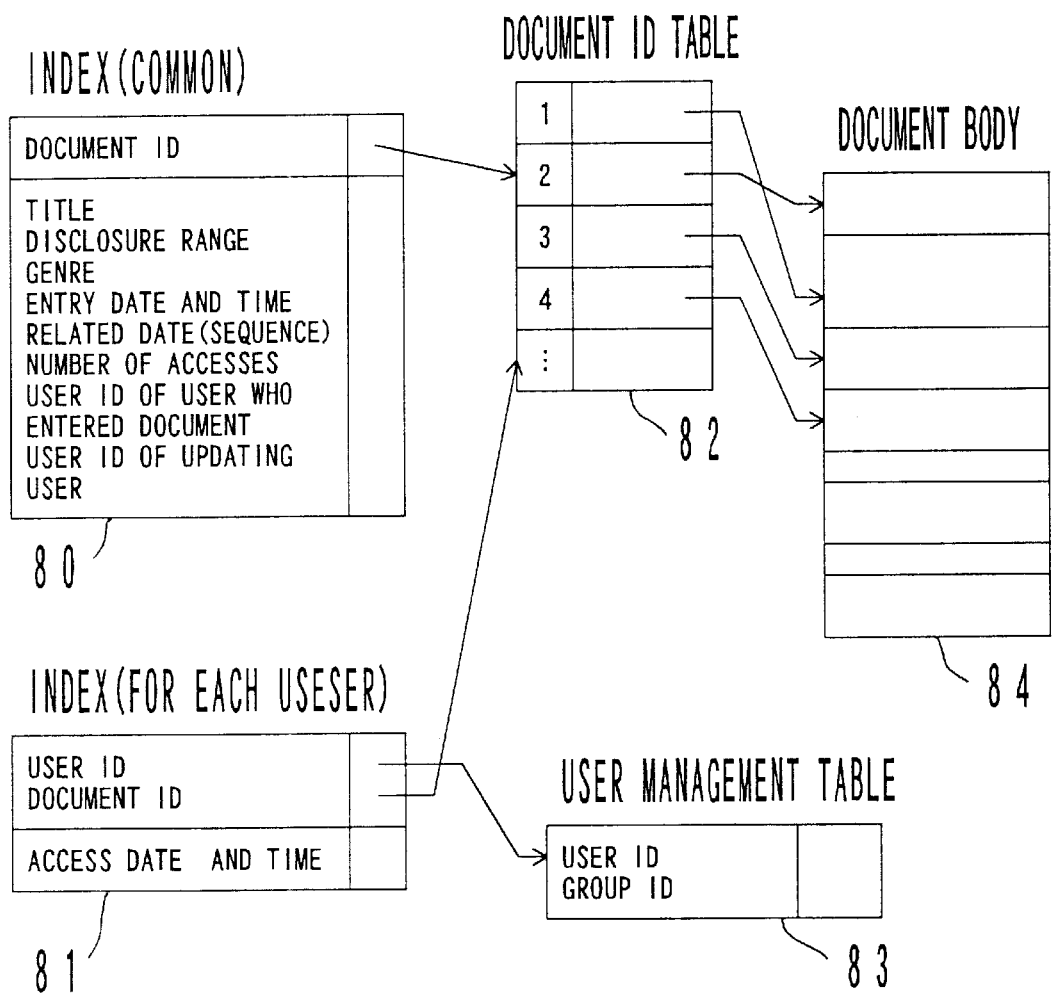
FIG. 9 is a diagram for use in explanation of management of documents in the shared machine.

FIG. 9 is a diagram which is useful in explaining the document management in the shared machine.

As shown in FIG. 9, document indexes include an index 80 which is common to users (common index) and an index 81 which varies with users (index for each user). The common index 80 permits title, document disclosure range, genre, date and time of entry, related date (sequence), number of accesses, ID of a user who entered the document, and ID of a user who is updating the document to be fetched from the document ID.

The index 81 is prepared for each combination of a document ID and a user ID and stores information about date and time at which the corresponding browsing user made access to the corresponding document. Thus, when a user makes access to a new document, a new index 81 is created correspondingly to a combination of the ID of that user and the ID of that document. Data in those indexes 80 and 81 are dynamically changed as needed.

There are further provided a document ID table 82 which establishes a correspondence between the document ID and the corresponding document body 84, and a user management table 83 which establishes a correspondence between the user and the corresponding group. The user management table 83 is used to check the range of document disclosure.
Phase of document ordering The document ordering block 40 shown in FIG. 1 presents to users the contents of already entered documents and presents the titles of the documents in a certain order.

Figure 10:
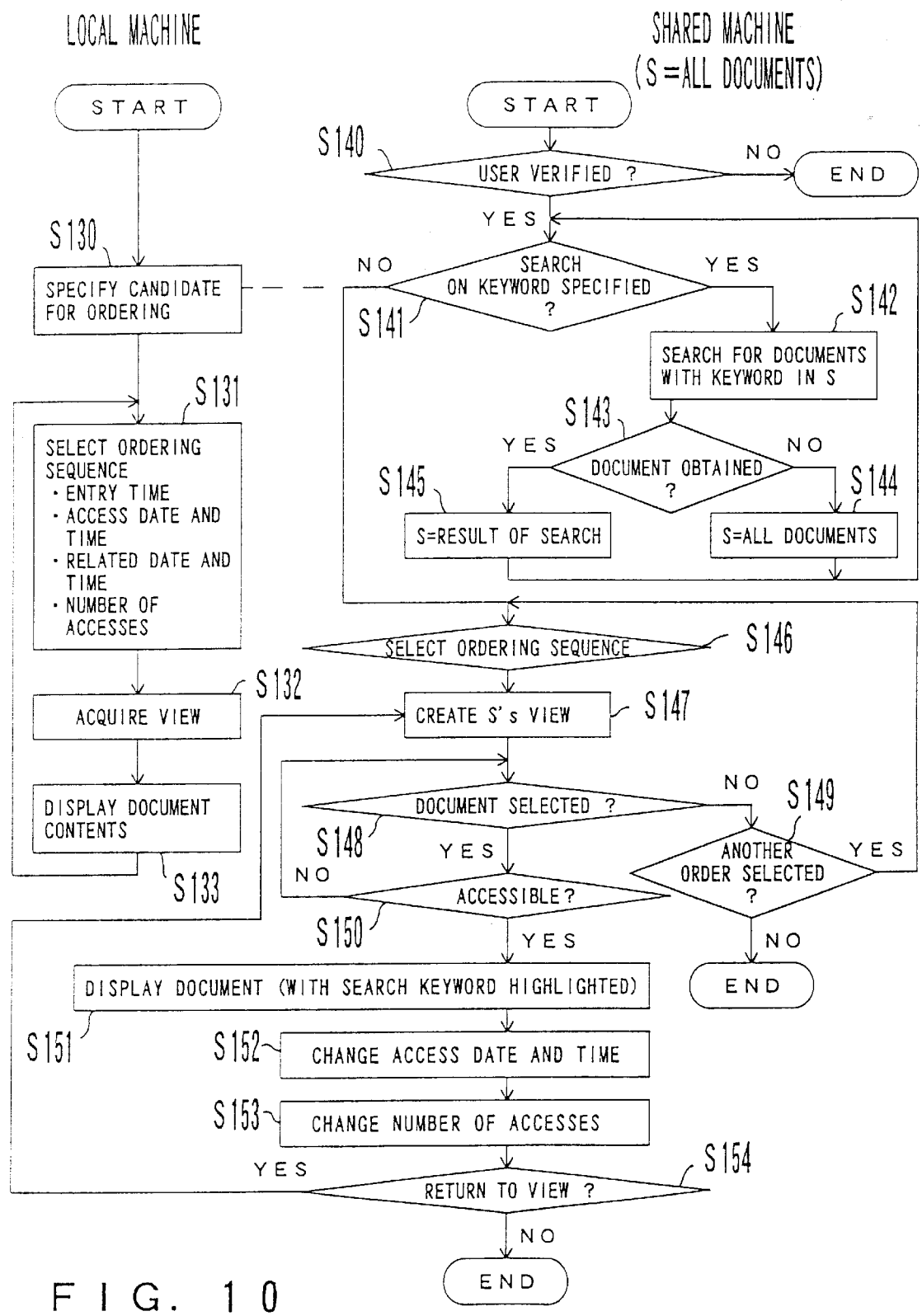
FIG. 10 is a flowchart for access to documents.

FIG. 10 is a flowchart for access to a document.

In the local machine, in making access to a document, a user specifies in step S130 whether documents to be ordered should cover all the documents or documents containing a specific keyword. The search on keyword permits the number of target documents to be ordered to be reduced.

In subsequent step S131, the way in which documents are ordered is selected. The ordering can be selected from the document entry order (date and time), the order of latest accesses (date and time), the order of related date and time in the contents of documents, and the order of the number of accesses. The selected ordering information is sent to the shared machine to acquire a view from the shared machine in step S132. This view is, for example, a list of titles ordered in the specified order.

When, in step S133, the user selects one document or document ID from the view, the document is fetched from the shared machine and its contents are then displayed. By repeating steps S131 to S133, the user can access information while changing the ordering.

The shared machine performs the following procedures. Assuming S to be a group of documents to be ordered, at first S covers all the documents.

In step S140, the user who is making access is verified. When the user is not one authorized to make access, the procedure ends.

The search based on keyword can reduce the number of target documents. When, in step S141, the search on keyword is specified in the local machine, documents which, of the group S of documents that are current candidates for ordering, contain a specified keyword are searched for in step S142. If, in step S143, corresponding documents are obtained and the user is satisfied with the result of the search, S is set as a group of the obtained documents in the search. If the result of search is that there is no corresponding document, then S is set to cover all the documents in step S144.

When, in step S146, the document ordering selected by the user in the local machine is received, a view for the document group S is created in accordance with that order in step S147 and sent to the local machine.

In step S148, a decision is made as to whether the user has selected a document. When the user has selected a document, a check is made in step S150 as to whether the document is accessible. If it is accessible, the procedure goes to step S151. If, in step S149, another ordering is selected, the procedure returns to step S146. If neither document selection nor ordering selection is made, the procedure is terminated.

In step S151, the contents of the specified document are sent to the local machine for display. In the case of search on keyword, the keyword is highlighted in the displayed document.

In steps S152 and S153, the latest date and time of access and the number of accesses in the indexes 80 and 81 are changed because an access was made.

In step S154, a decision is made as to whether a return is to be made from the document display to the view display. If so, the procedure returns to step S147; otherwise, the procedure is terminated.

In step S131, the document ordering can be optionally selected from the following four and switched from one order to another. A user can make an access to a document based on the ordered information.

1. The order of date and time of document entry: Titles of documents are lined from the latest one to the oldest one in the order of a time at which they were entered by users. This is a user-independent ordering method.
2. The order of date and time of latest access: Titles of documents are lined from the latest one to the oldest one in the order of a time at which they were read by browsing users. The index 81 varies with user-document combinations. Here, for example, index 81 for a document to which the user made access is pulled out from the indexes 81 on a stack and then put on the top of the stack. This is a user-dependent ordering method.
3. The order of document-related date and time: Date representation patterns in documents are extracted automatically and the titles of the documents are displayed on the corresponding dates in a calendar. This is a user-independent ordering method.
4. The order of the number of accesses: Titles of documents are lined in the order of the number of times each document was read. The order may be an ascending one or a descending one. This method can be used for both a single user and two or more users.

Phase of document update

The document updates can be performed using document IDs appended by the document filing block 30. The user can know document IDs in any ordering method (view) performed by the document ordering block 40.

Figure 11:
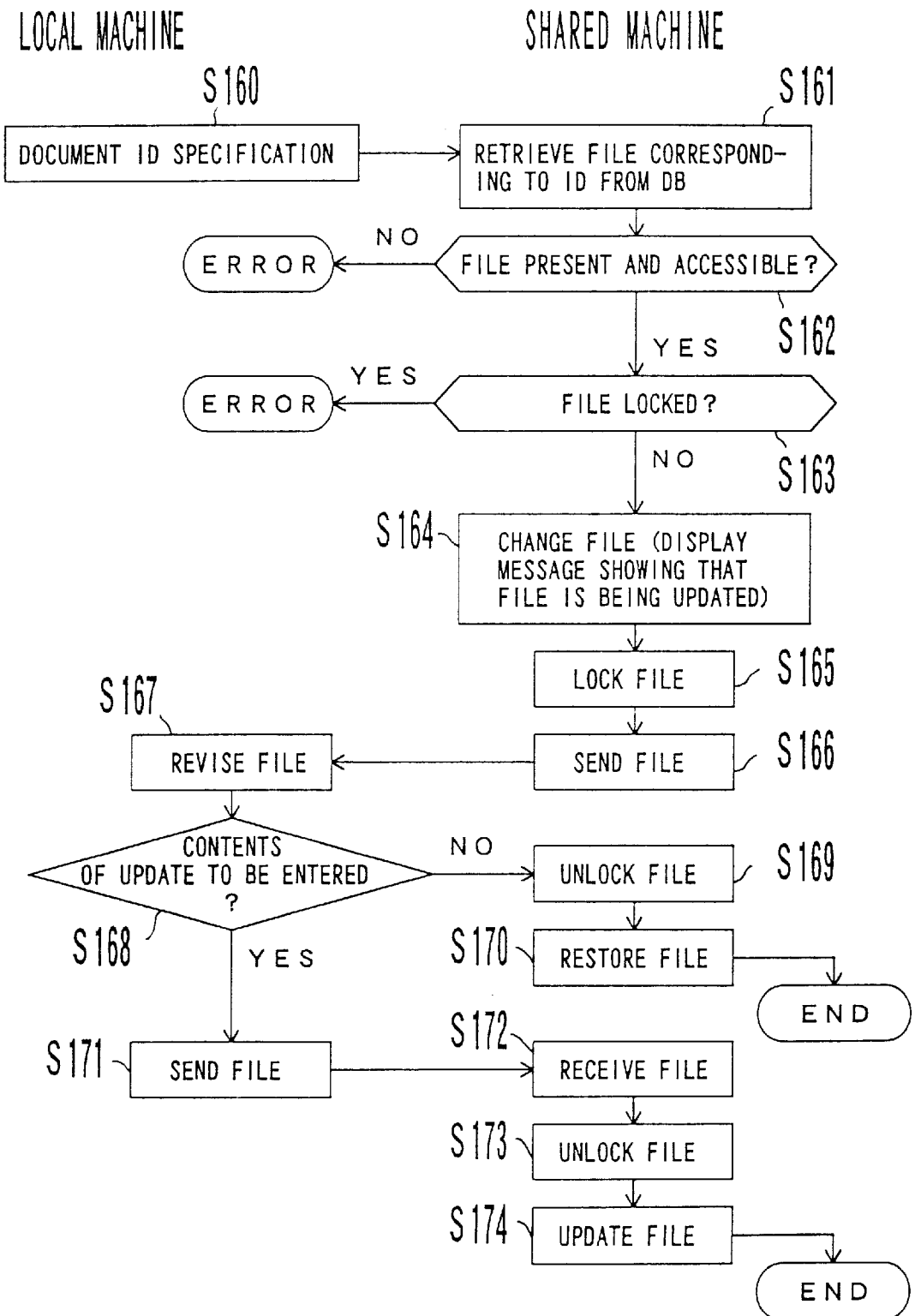
FIG. 11 is a flowchart for updating a document.

FIG. 11 is a flowchart for the document update.

In step S160 shown in FIG. 11, the ID of a document to be updated is specified by the editor or word processing software on the local machine.

In step S161, in response to the document ID being specified on the local machine, the shared machine retrieves a document file corresponding to the document ID from the database.

In step S162, a decision is made as to whether the corresponding file is present and accessible by the user. If the corresponding file is absent or the user is not allowed to make access, the request is rejected as error. When the file has already been locked, the request is likewise rejected in the judgement of step S163.

In step S164, a change is made to the file and a message showing that the file is currently updated is additionally displayed. This allows other users to know that the file is being updated by someone.

In step S165, the file is locked. Any other user cannot update this file until it is unlocked.

In step S166, the file is sent to the local machine.

In step S167, in the local machine, a change is made to the file sent from the shared machine using the editor or word processing software.

In step S168, the user is inquired of as to whether the contents of the update are to be entered. When the entry of the update is canceled, the shared machine is notified of that. In response to this, the shared machine unlocks the file in step S169 and restores the file to its original contents in step S170. The procedure then comes to an end.

On the other hand, if, in the local machine, a command is given to enter the contents of the update, the file is sent to the shared machine in step S171. The shared machine receives the file in step S172 and then unlocks it in step S173. In step 174, the corresponding file in the database is updated.

Specific examples of documents and views will be described hereinafter.

Example of electronic mail/news information sharing system

When, while reading electronic mail (mailing list) or news on the Internet, a user presses the entry button for information he or she considers important, the information is shared on the Internet.

FIG. 12 shows an example of a document which a user wishes to enter and is being displayed on the screen of an editor, word processor, or news reader. There are provided a title area 90 at the top of the screen, a body area 91 at the center of the screen, and a control area 92 at the bottom of the screen. In the title area 90 is displayed a list of the titles of documents whose bodies can be referred to. The contents of a document selected among from those documents (it is indicated by a black dot in the figure) are displayed in the body area 91. The control area 92 is used for user options and information entry. Note that the list of titles displayed in the title area 90 is different from the view 43 shown in FIG. 1.

When a user clicks or presses the entry button (not shown) on the screen or keyboard, the screen is changed as shown in FIG. 13. In the control area 92, the user is prompted to enter a new title which is to be appended to the document for entry into the database. When a title is already present in mail or news, the default title is displayed as shown in FIG. 13. The user can change it as needed.

FIG. 14 shows an example of a screen in which the genre of the document is being input subsequent to entry of the title. The genre of the document can be chosen with the aid of a cursor from among the following items:

(a) None
(b) Business
(c) Computer
(d) News
(e) Hobby

In the example of FIG. 14, the genre "Computer" is chosen.

FIG. 15 shows an example of a screen when the range of document disclosure (sharing range) is set next. The information disclosure range can be chosen from among the following items:

(a) Person
(b) Group
(c) Laboratory
(d) Company
(e) General

In the example of FIG. 15, "Laboratory" is chosen.

The information thus entered allows the user to browse with the use of views arranged variously.

FIG. 16 shows an example of a display (view) of index information arranged in the order of access time.

In this example, the previously entered index titled "ACL-95 Corpus-based NLP Workshop" is shown at the top. In the case of search on keyword to narrow down information for display, a keyword is input into a box 93 at the top of the screen.

When the title "ACL-95 . . . " is clicked in the screen shown in FIG. 16, the document contents are displayed as shown in FIG. 17. Because of the use of personal authentication, the document contents are not displayed to users who are not granted right of access.

Suppose that, in the page in which the documents are ordered in terms of access time shown in FIG. 16, the title "service business news" is clicked so as to read its body. Then, as shown in FIG. 18, the title of the document which was read last is displayed at the top at the time of next access. The earlier documents are read, the lower they are displayed. Titles out of the screen can be displayed on the screen by means of scrolling.

FIG. 19 shows an example of a screen in which document titles are displayed embedded in a calendar in the order of dates related to the documents.

The above-described "ACL-95 Corpus-based NLP Workshop" is displayed on the date that it was announced. That is, its body bears date information "Friday, Jun. 30, 1995" as shown in the body area 91 of FIG. 12. This date information is automatically extracted and then managed in the index 80. Thus, the document title is displayed in the section for the thirtieth day (Friday) in the calendar form display as shown in FIG. 19.

When a plurality of related dates are involved in a document, its title is displayed in each of the calendar sections that correspond to those related dates.

Example of schedule sharing system

The next embodiment is intended to allow two or more users to enter information in the same format and sort it in common, thereby allowing the users to share schedule information.

This embodiment has the following features:

(1) Each user enters a schedule in the form of a document.
(2) There is a hierarchical relationship between persons and groups. The schedule of a group in a higher level is inherited by a person (or a member) in a lower level.

On the local machine, persons describe schedule information in such a format as follows:

9/2 9:30 MI) sectional meeting
96/9/3 9:30→ Makuhari (a name of a place)
96/9/3 9:30–11:30IR) search group conference
9/19/96(Thurs.) AM arrangement on main building 1F There are conventions that the group schedule should begin with group ID such as "MI)" or "IR)", a business trip should begin with a simbol ">", and so on. However, basically users simply describe information "date, time, event" in free format.

Calendar views include the following:

(1) The most recent schedule of the group

The schedule of two weeks before and three weeks after today is displayed. At each date is displayed the following information:

(a) The group schedule contents (b) Schedule contents of higher level (or group) (displayed in a different color)

(c) Initials of personal names of group members who have a schedule (2) Personal recent schedules The schedule of two weeks before and four weeks after today are displayed. At each date is displayed the following information:

(a) Personal schedule contents (b) Schedule contents of the groups to which the person belongs (displayed in a different color)

FIG. 20 shows an example of a view of the recent schedule of a person.

(3) Group monthly schedule

It is displayed on the calendar for the corresponding month. At each date the same information as in the group recent schedule is displayed. The initials of persons having schedules are displayed.

FIG. 21 shows an example of a view for group monthly schedule.

(4) Personal monthly schedule

It is displayed on the calendar for the corresponding month. At each date the same information as in the group recent schedule is displayed.

(5) Weekly schedule

It is displayed on the calendar for the corresponding week. At each date, the user name and the schedule contents of each person having a schedule on that day are displayed.

FIG. 22 shows an example of a view of a weekly schedule.

FIG. 23 shows the transition from each calendar view to another.

For example, when, in the state where the group's recent schedule is displayed, a user name is clicked (U), the transition is made to the personal schedule view of that user. On the other hand, when, in the state where the group's recent schedule is displayed, a date is clicked (D), the transition is made to the weekly schedule view containing that date.

Thus, clicking a user name (U), a group name (G), a date (D), or a month (M) allows the transition to take place from one calendar view to another.

Example of group-shared document editing system

In publishing information using the Internet WWW, in many cases a person who has new information within a group updates the information because there is not always a person in charge. This example is an embodiment as a tool for supporting such an HTML document update.

Figure 27:
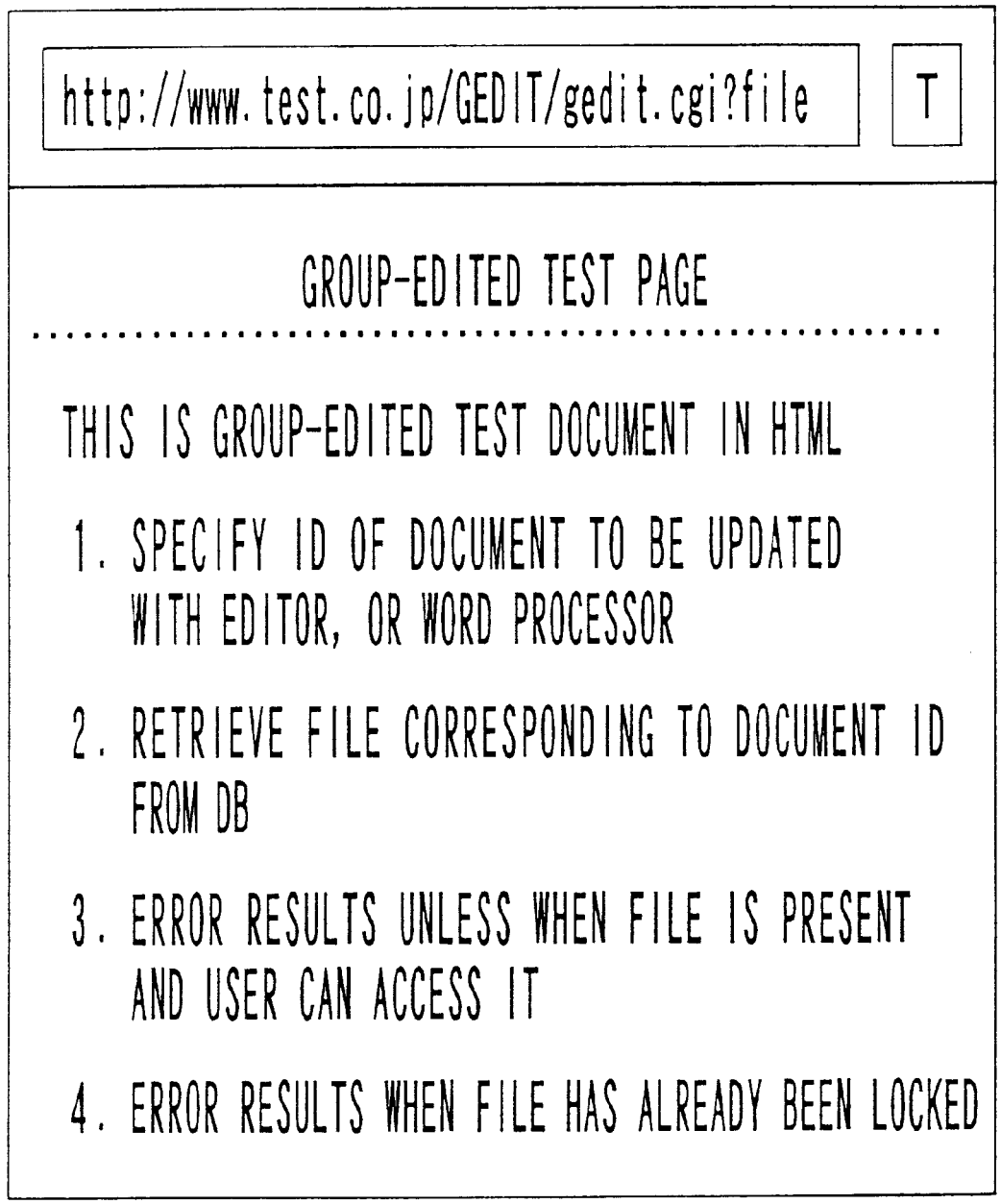
FIG. 27 shows an example of a display screen when the updated shared document is viewed with the browser.

FIG. 24 shows an example of a screen in which a shared document prior to update is viewed on a browser. FIG. 25 shows an example of a screen in which the shared document shown in FIG. 24 is being edited by an editor. FIG. 26 shows an example of a screen in which another user is about to update the shared document that is being updated. FIG. 27 shows an example of a screen in which the shared document after updating is viewed by the browser.

When a URL is specified on the editor of the local machine, a document is copied and becomes editable as shown in FIG. 25.

When a document is being updated by someone, information of "being updated by x x x" is added and displayed on the document display screen in the local machine as shown in FIG. 26. The document cannot be updated by another person until the current updating by someone terminates.

After the updating, the display screen changes as shown in FIG. 27. In this case, since there is no display of information of "being updated by x x x", it will be understood that other persons may update the document.

As described above, the present invention provides the following advantages:

(1) Anyone can easily publish information to the Internet through the use of an editor that they use usually. Information to be published may be documents made by themselves or introductions showing that particular information is present in news or mailing lists.

(2) Since a range of document disclosure (sharing range) can be specified with additional information at the time of entry, a memo or message board that is shared among groups can be implemented.

(3) By devising information to be entered, group schedule management can be implemented.

(4) According to indexes based on ordering by the number of accesses and the date and time of access, it is possible for users to easily know a document that is now frequently referred to because it is displayed in the upper portion of the screen.

(5) The results of search are displayed arranged in such a way that frequently accessed information or fresh information is displayed on the upper portion, thus facilitating the selection of information that a user feels like reading in a high probability.

What is claimed is:

1. A document sharing system which includes a shared machine for sorting and managing documents and at least one local machine for allowing users to access the documents, the shared machine and the local machine being connected via a network, comprising:

document filing means for sending a document present in the local machine to the shared machine via the network and storing the document with a document ID appended;

document ordering means for listing documents ordered by at least one of time information and information related to accessing the documents, and for presenting information about the documents as ordered to a receiving user; and document updating means for receiving a specified document ID and updating a corresponding document of the specified document ID on the local machine.

2. The document sharing system according to claim 1, wherein the document filing means includes conversion means for converting an entered document into a specific structure based on at least one of information added by an entering user at the time of entry and information automatically extracted from document contents.

3. The document sharing system according to claim 1, wherein said document filing means includes means for creating a unique ID on the network and appending the unique ID to a document.

4. The document sharing system according to claim 1, wherein the document filing means includes means for, at the time of document entry, entering index information required for ordering documents, and the document ordering means includes means for updating the index information according to a user access to one of the documents.

5. The document sharing system according to claim 1, wherein the document ordering means includes means for ordering title information of all of the documents or documents that contain a certain character string specified by the receiving user in order of document entry time and presenting the title information as ordered to the receiving user.

6. The document sharing system according to claim 1, wherein the document ordering means includes means for ordering title information of all of the documents or documents that contain a certain character string specified by the receiving user in order of last time each of the documents was read and presenting the title information as ordered to the receiving user.

7. The document sharing system according to claim 1, wherein the document ordering means includes means for ordering title information of all of the documents or documents that contain a certain character string specified by the receiving user in order of number of times each of the documents was read and presenting the title information as ordered to the receiving user.

8. The document sharing system according to claim 1, wherein the document ordering means includes means for displaying title information of all of the documents or documents that contain a certain character string specified by a specifying user such that the title information is placed on a calendar associated with date information automatically extracted from the documents.

9. A shared document management device, comprising:
means for receiving documents sent from a local machine, storing the received documents with corresponding document IDs appended, and entering index information required for document listing;
means for creating a view in which title information of all of the documents or documents that contain a certain character string specified by a user is listed in order of at least one of time information and information related to accessing the documents; and
means for sending the contents of a document requested by the local machine to 10 the local machine and updating corresponding index information.

10. The shared document management device according to claim 9, further comprising:
means responsive to a file update request by a user from the local machine for performing exclusive control on a file to disable other users from accessing the file and sending the file to the local machine; and
means for receiving the file revised in the local machine, updating the file for entry, and releasing the exclusive control.

11. A document access devices comprising:
means for sending a document to be entered via a network to a shared machine that manages documents entered in the shared machine;
means for detecting access to a document entered in the shared machine, for specifying an order based on at least one of time information and information related to an access to the documents, and for receiving and displaying a view containing title information of the documents and created according to the order as specified; and
means for displaying the contents of a document selected in the view and sent from the shared machine.

12. The document access device according to claim 11, further comprising means for browsing document information by switching views, each view created by the shared machine for each user as specified by the user.

13. The document access device according to claim 11, further comprising:
means for, when a user specifies a document ID on the network, receiving a copy of a document corresponding to the document ID specified by the user from the shared machine via the network;
means for revising the contents of the document received; and
means for sending revised contents of the document to the shared machine via the network and requesting the shared machine to reenter the document as revised.

14. An information sharing device, comprising:
means for creating unique identification information on a network based on user identification information and entry time information, and appending the identification information to electronic information that is created by arbitrary software and converted into a format sharable on the network; and
database means for filing the electronic information.

15. An information sharing device, comprising:
database means for filing electronic information that is created by arbitrary software and converted into a format sharable on a network;
storage means for storing index information for listing the electronic information in a specific order of at least one of time information and information related to accessing the electronic information; and
ordering means for listing management information for at least one piece of electronic information in the specific order by referring to the index information of the electronic information.

16. An information terminal devices comprising:
specifying means for specifying an order based on at least one of time information and information related to accessing electronic information; and
display means for displaying management information for at least one piece of the electronic information ordered in the specified order.

17. A computer-readable storage medium storing a process used by a computer to direct the computer to perform the steps of:
creating unique identification information on a network based on user identification information and entry time information;
appending the identification information to electronic information that is created by arbitrary software and converted into a format sharable on the network; and
filing the electronic information.

18. A computer-readable storage medium storing a process used by a computer to direct the computer to perform the steps of:
filing electronic information created by arbitrary software and converted into a format sharable on a network;
creating index information for sorting the electronic information;
listing management information for at least one piece of electronic information in order of at least one of time information and information related to accessing the electronic information by referring to the index information of the electronic information; and
outputting the management information for the at least one piece of electronic information as ordered.

19. A computer-readable storage medium storing a process used by a computer to direct the computer to perform the functions of:

specifying an order based on at least one of time information and information related to accessing electronic information; and displaying management information for at least one piece of electronic information in the specified order.

20. An information sharing method, comprising:

creating electronic information with arbitrary software;

automatically converting the electronic information to converted electronic information in a format sharable on a network;

creating unique identification information on the network based on at least one of user identification information and time information and appending the identification information to the converted electronic information; and filing the electronic information.

21. An information sharing method, comprising:

creating electronic information with arbitrary software;

automatically converting the electronic information to a format sharable on a network;

filing the electronic information;

creating index information for ordering the electronic information;

specifying an order based on at least one of time information and information related to accessing the electronic information;

ordering management information for at least one piece of electronic information according to the order by referring to the index information of the electronic information; and displaying the management information for the at least one piece of electronic information.

* * * * *

UNITED STATES PATENT AND TRADEMARK OFFICE
CERTIFICATE OF CORRECTION

PATENT NO.:     5,999,968
DATED      :    December 7, 1999
INVENTOR(S):    Hiroshi TSUDA It is certified that error appears in the above-identified patent and that said Letters Patent is hereby corrected as shown below:

In the CLAIMS:

Column 16, line 33,   after "devices" insert --,--;

line 42,   replace "steps" with --operations--;

line 53,   replace "steps" with --operations--; and line 67,   replace "functions" with --operations--.

Column 17, line 17,   after first occurrence of "and" insert --entry--.

Signed and Sealed this

Twenty-fourth Day of October, 2000

Attest:

Attesting Officer

Q. TODD DICKINSON
Director of Patents and Trademarks